United States Patent
Abbey et al.

(10) Patent No.: US 12,270,981 B2
(45) Date of Patent: Apr. 8, 2025

(54) METHOD OF ANALYSIS OF A SAMPLE INCLUDING FORMING AN IMAGE AND CONTROLLING A SUBSEQUENT ANALYSIS PROCESS USING THE IMAGE FORMED

(71) Applicant: LA TROBE UNIVERSITY, Melbourne (AU)

(72) Inventors: Brian Abbey, Melbourne (AU); Eugeniu Balaur, Melbourne (AU)

(73) Assignee: LA TROBE UNIVERSITY, Melbourne (AU)

( * ) Notice: Subject to any disclaimer, the term of this patent is extended or adjusted under 35 U.S.C. 154(b) by 424 days.

(21) Appl. No.: 17/297,977

(22) PCT Filed: Nov. 29, 2019

(86) PCT No.: PCT/IB2019/060307
§ 371 (c)(1),
(2) Date: May 27, 2021

(87) PCT Pub. No.: WO2020/110070
PCT Pub. Date: Jun. 4, 2020

(65) Prior Publication Data
US 2022/0091407 A1    Mar. 24, 2022

(30) Foreign Application Priority Data
Nov. 29, 2018    (AU) ................................ 2018904552

(51) Int. Cl.
*G02B 21/34*    (2006.01)
*G01N 21/25*    (2006.01)
(Continued)

(52) U.S. Cl.
CPC ........... *G02B 21/34* (2013.01); *G01N 21/255* (2013.01); *G01N 21/553* (2013.01); *G02B 21/06* (2013.01);
(Continued)

(58) Field of Classification Search
CPC ...... G02B 21/34; G02B 21/06; G02B 21/367; G02B 21/00; G02B 21/0004;
(Continued)

(56) References Cited

U.S. PATENT DOCUMENTS

| 5,836,872 A | 11/1998 | Kenet et al. |
| 6,404,916 B1 | 6/2002 | De La Torre-Bueno |

(Continued)

FOREIGN PATENT DOCUMENTS

| CN | 1582394 A | 2/2005 |
| CN | 1957245 A | 5/2007 |

(Continued)

OTHER PUBLICATIONS

U.S. Appl. No. 17/297,974, filed May 27, 2021, Abbey et al.
(Continued)

*Primary Examiner* — Arnel C Lavarias
(74) *Attorney, Agent, or Firm* — Knobbe, Martens, Olson & Bear, LLP

(57) ABSTRACT

A method of analysis of a sample is described. The method includes providing a sample holder having an upper surface and a lower surface, the upper surface having a plasmonic layer associated therewith, the plasmonic layer including a periodic array of sub-micron structures. A sample is applied to the sample holder and illuminated. At least one localised structural property of the sample is visible in an image formed based on the colour of the received light. The method includes using the image formed to control a subsequent analysis process. The subsequent analysis process can be another microscopy process such as TEM, SEM or the like.

23 Claims, 6 Drawing Sheets

(51) Int. Cl.
   *G01N 21/552* (2014.01)
   *G02B 21/06* (2006.01)
   *G02B 21/36* (2006.01)
   *G06T 7/00* (2017.01)

(52) U.S. Cl.
   CPC .......... *G02B 21/367* (2013.01); *G06T 7/0012* (2013.01); *G06T 2207/10061* (2013.01); *G06T 2207/30024* (2013.01)

(58) Field of Classification Search
   CPC .............. G02B 21/002; G02B 21/0032; G02B 21/0052; G02B 21/008; G02B 21/36; G02B 21/361; G06T 7/0012; G06T 2207/10061; G06T 2207/30024; G01N 21/255; G01N 21/553; G01N 21/25; G01N 21/554
   USPC ....... 359/398, 362, 363, 368, 369, 385, 396; 356/402, 244
   See application file for complete search history.

(56) References Cited

U.S. PATENT DOCUMENTS

| | | |
|---|---|---|
| 6,650,357 B1 | 11/2003 | Richardson |
| 8,154,722 B2 | 4/2012 | Yamada et al. |
| 8,536,545 B2 | 9/2013 | Wu et al. |
| 8,687,180 B2 | 4/2014 | Cohen |
| 9,304,234 B2 * | 4/2016 | Liu .................. G02B 5/008 |
| 9,482,784 B2 | 11/2016 | Yen et al. |
| 9,675,288 B2 | 6/2017 | Yamakawa et al. |
| 9,744,793 B2 | 8/2017 | Petiton et al. |
| 10,185,137 B2 | 1/2019 | Dai et al. |
| 10,768,105 B1 | 9/2020 | Mohan et al. |
| 11,150,038 B1 | 10/2021 | Poole et al. |
| 11,506,881 B2 | 11/2022 | Balaur et al. |
| 11,545,237 B2 | 1/2023 | Meyer et al. |
| 11,774,361 B2 | 10/2023 | Fereidouni et al. |
| 11,798,300 B2 | 10/2023 | Cotte et al. |
| 2002/0115224 A1 | 8/2002 | Rudel et al. |
| 2003/0096302 A1 | 5/2003 | Yguerabide et al. |
| 2005/0136549 A1 | 6/2005 | Gholap et al. |
| 2007/0153267 A1 | 7/2007 | Wang et al. |
| 2007/0178607 A1 | 8/2007 | Prober et al. |
| 2008/0099667 A1 | 5/2008 | Stark et al. |
| 2008/0252894 A1 | 10/2008 | Lakowicz et al. |
| 2008/0252984 A1 | 10/2008 | Lee et al. |
| 2008/0274905 A1 | 11/2008 | Greene |
| 2009/0060303 A1 | 3/2009 | Douglass et al. |
| 2009/0153866 A1 | 6/2009 | Yamamichi et al. |
| 2010/0062422 A1 | 3/2010 | Ausserre |
| 2010/0142259 A1 | 6/2010 | Drindic et al. |
| 2010/0254589 A1 | 10/2010 | Gallagher |
| 2010/0264032 A1 | 10/2010 | Bazant |
| 2010/0290692 A1 | 11/2010 | Macaulay et al. |
| 2010/0291575 A1 | 11/2010 | Shamah et al. |
| 2011/0157593 A1 | 6/2011 | Miyadera et al. |
| 2012/0113424 A1 | 5/2012 | Suda et al. |
| 2013/0065777 A1 | 3/2013 | Altug et al. |
| 2013/0279789 A1 | 10/2013 | Elter et al. |
| 2014/0131559 A1 | 5/2014 | Yen et al. |
| 2014/0168651 A1 | 6/2014 | Guo |
| 2014/0206101 A1 | 7/2014 | Liu et al. |
| 2014/0327913 A1 | 11/2014 | Pacifici et al. |
| 2014/0349278 A1 | 11/2014 | Yamamoto |
| 2015/0002843 A1 | 1/2015 | Yokogawa |
| 2015/0177140 A1 | 6/2015 | Guo |
| 2016/0108256 A1 | 4/2016 | Yang et al. |
| 2016/0110584 A1 | 4/2016 | Remiszewski et al. |
| 2016/0258114 A1 | 9/2016 | Firth et al. |
| 2016/0290926 A1 | 10/2016 | Notingher et al. |
| 2016/0306157 A1 | 10/2016 | Rho et al. |
| 2016/0334398 A1 | 11/2016 | Weissleder et al. |
| 2016/0355869 A1 | 12/2016 | Blair et al. |
| 2016/0357026 A1 | 12/2016 | Astratov et al. |
| 2016/0370290 A1 | 12/2016 | Raphael et al. |
| 2018/0045644 A1 | 2/2018 | Baumgold |
| 2018/0066937 A1 | 3/2018 | Ikeda et al. |
| 2018/0107038 A1 | 4/2018 | Chen et al. |
| 2018/0202918 A1 | 7/2018 | Tanaka et al. |
| 2019/0071779 A1 | 3/2019 | Hamers et al. |
| 2019/0154652 A1 | 5/2019 | Ghosh et al. |
| 2019/0195809 A1 | 6/2019 | Agarwal et al. |
| 2019/0317011 A1 * | 10/2019 | Hu .................. B01J 20/268 |
| 2020/0116987 A1 | 4/2020 | Kleppe et al. |
| 2020/0142173 A1 | 5/2020 | Balaur et al. |
| 2020/0264043 A1 | 8/2020 | Allen |
| 2020/0285043 A1 | 9/2020 | Nyga et al. |
| 2020/0319382 A1 | 10/2020 | Guo et al. |
| 2020/0326282 A1 | 10/2020 | Singamaneni et al. |
| 2021/0181391 A1 | 6/2021 | Subramaniyam et al. |
| 2022/0059866 A1 | 2/2022 | Mukherjee et al. |
| 2022/0091307 A1 | 3/2022 | Abbey et al. |
| 2022/0091407 A1 | 3/2022 | Abbey et al. |
| 2022/0092824 A1 | 3/2022 | Abbey et al. |
| 2022/0215533 A1 | 7/2022 | Abbey et al. |
| 2022/0235415 A1 | 7/2022 | Fretes |
| 2022/0381984 A1 | 12/2022 | Li et al. |
| 2023/0266291 A1 | 8/2023 | Myrick |

FOREIGN PATENT DOCUMENTS

| | | |
|---|---|---|
| CN | 101031789 A | 9/2007 |
| CN | 102317781 A | 9/2007 |
| CN | 101470219 | 9/2010 |
| CN | 102460171 A | 5/2012 |
| CN | 103018167 A | 4/2013 |
| CN | 101952697 | 8/2014 |
| CN | 104919299 A | 9/2015 |
| CN | 105974571 A | 9/2016 |
| CN | 205691505 U | 11/2016 |
| CN | 1084744874 A | 8/2018 |
| DE | 10329195 A1 | 1/2005 |
| DE | 102012214932 | 2/2014 |
| EP | 2 653 903 | 10/2013 |
| EP | 3 121 587 | 1/2017 |
| EP | 2146229 | 4/2019 |
| JP | 2001133618 | 5/2001 |
| JP | 2007-501391 | 1/2007 |
| JP | 2007192806 | 8/2007 |
| JP | 2007-538264 | 12/2007 |
| JP | 2009222401 | 10/2009 |
| JP | 2009223123 | 10/2009 |
| JP | 2010009025 | 1/2010 |
| JP | 2011-53151 | 3/2011 |
| JP | 2011-252928 | 12/2011 |
| JP | 2012159792 | 8/2012 |
| JP | 2013-142546 | 7/2013 |
| JP | 2013-231682 | 11/2013 |
| JP | 2015-12128 | 1/2015 |
| JP | 2015012128 A * | 1/2015 ............ G01J 3/0205 |
| JP | 2016212126 | 12/2016 |
| JP | 2015-514225 | 3/2018 |
| JP | 2018-528405 | 9/2018 |
| JP | 2018-532132 | 11/2018 |
| KR | 20120075189 | 12/2012 |
| TW | 201418698 | 5/2014 |
| WO | WO 2003/073817 | 9/2003 |
| WO | WO 2005/017570 | 2/2005 |
| WO | WO 2005/114298 | 12/2005 |
| WO | WO 2008/039212 | 4/2008 |
| WO | WO 2009/072098 | 6/2009 |
| WO | WO 2009/089292 | 7/2009 |
| WO | WO 2010/075033 | 7/2010 |
| WO | WO 2010/132890 | 11/2010 |
| WO | WO 2011/163624 | 12/2011 |
| WO | WO 2013/089996 | 6/2013 |
| WO | WO 2014/053955 | 4/2014 |
| WO | WO 2015005904 | 1/2015 |
| WO | WO 2015/056584 | 4/2015 |
| WO | WO 2015/140362 | 9/2015 |
| WO | WO 2015/199976 | 12/2015 |
| WO | WO 2017/051195 | 3/2017 |
| WO | WO 2017/109175 | 6/2017 |

(56) References Cited

FOREIGN PATENT DOCUMENTS

| WO | WO 2017/135430 | 8/2017 |
|---|---|---|
| WO | WO 2017/161097 | 9/2017 |
| WO | WO 2018/107038 | 6/2018 |
| WO | WO 2018/152157 | 8/2018 |
| WO | WO 2018/213881 | 11/2018 |
| WO | WO 2020/110069 | 6/2020 |
| WO | WO 2020/110070 | 6/2020 |
| WO | WO 2020/110071 | 6/2020 |
| WO | WO 2020/110072 | 6/2020 |

OTHER PUBLICATIONS

U.S. Appl. No. 17/297,979, filed May 27, 2021, Abbey et al.
U.S. Appl. No. 17/297,980, filed May 27, 2021, Abbey et al.
Altunbay, D. et al. Color Graphs for Automated Cancer Diagnosis and Grading, Mar. 2010.
Arora, P. and Krishnan, A. "Fourier plane colorimetric sensing using broadband imaging of surface plasmons and application to biosensing," Dec. 16, 2015.
Huang, Fu Min et al. "Nanohole Array as a Lens," Jun. 2008.
Huang, Fu Min et al. "Focusing of Light by a Nano-Hole Array," Dec. 2006.
Jiang, Jing et al. "Plasmonic Nano-arrays for Ultrasensitive Bio-Sensing," published Aug. 28, 2018.
Schmid, P. "Segmentation of Digitized Dermatoscopic Images by Two-Dimensional Color Clustering," Feb. 1999.
Wisaeng, K and Sa-Ngiamvibool, W. "Improved fuzzy c-means clustering in the process of exudates detection using mathematical morphology," Mar. 7, 2017.
Wu, Li and Qu Xiaogang "Cancer Biomarker Detection: Recent Achievements and Challenges," Mar. 5, 2015.
Lee Seung-Woo et al: "Highly Sensitive Biosensing Using Arrays of Plasmonic Au Nanodisks Realized by Nanoimprint Lithography", ACS Nano, vol. 5, No. 2, Jan. 11, 2011 (Jan. 11, 2011), pp. 897-904, XP055943779, US, ISSN: 1936-0851, DOI: 10.1021/nn102041m.
Mudachathi Renilkumar et al: "Design of a 1-7 colorimetric sensing platform using reflection mode plasmonic colour filters", Proceedings of SPIE; [vol. 10524], SPIE, US, vol. 10346, Aug. 25, 2017 (Aug. 25, 2017), pp. 103460D-103460D, XP060092566.
Balaur Eugenio et al: "Electron-beam induced diamond-like-carbon passivation of plasmonic devices", Biomedical Photonics and Optoelectronic Imaging : Nov. 8-10, 2000, Beijing, China; SPIE, Bellingham, Wash., US, vol. 9668, Dec. 22, 2015 (Dec. 22, 2015), pp. 966817-966817.
Langley et al: Dual pitch plasmonic devices for polarization enhanced colour based sensing;, Proceedings of SPIE; [vol. 10524], SPIE, US, vol. 10013, Dec. 9, 2016 (Dec. 9, 2016).
Kan et al: Sub-micron aperture plate for intracellular calcium transient measurement;, Transducers '05 : Seoul, Korea, [Jun. 5-9, 2005] ; Digest of Technical Papers, IEEE Operations Center, Piscataway, NJ, vol. 2, Jun. 5, 2005 (Jun. 5, 2005).
Shan Mingguang et al: "Refractive index variance of cells and tissues measured by quantitative phase imaging", Optics Express, [Online] vol. 25, No. 2, Jan. 23, 2017 (Jan. 23, 2017), p. 1573, XP055918186, ISSN: 1094-4087, DOI: 10.1364/OE.25.001573 Retrieved from the Internet: URL: https://www.osapublishing.org/viewmedia.cfm?URI=oe-25-2-1573> retrieved on Jul. 4, 2022].
European Supplementary Search Report for EP Application No. 19890517.6 dated Aug. 3, 2022 in 14 pages.
European Extended Search Report for EP Application No. 19889218.4 dated Aug. 9, 2022 in 10 pages.
European Search Report for EP Application No. 19889220.0 dated Aug. 12, 2022 in 14 pages.
European Search Report for EP Application No. 19890518.4 dated Aug. 4, 2022 in 9 pages.
Motevich I. G. et al: "Application of Plasmonic Silver Films in Histology for Contrast Enhancement", Journal of Applied Spectroscopy, vol. 79, No. 4, Sep. 2012 (Sep. 2012), pp. 632-636.
Wang X et al: "Self-Referenced Smartphone-Based Nanoplasmonic Imaging Platform for Colorimetric Biochemical Sensing", Analytical Chemistry, vol. 89, No. 1, Dec. 15, 2016 (Dec. 15, 2016), pp. 611-615.
Extended European Search Report for EP Application No. 19889220.0, dated Nov. 10, 2022.
Notice of Reasons for Rejection in JP Patent Application No. 2021-230110 (English translation), dated Apr. 11, 2023 in 6 pages.
Office Action for CN Application No. 201980090294.2 dated Feb. 2, 2023 and Search Report in 9 pages (no English translation available).
Notice of Reasons for Rejection in JP Patent Application No. 2021-530111, dated May 30, 2023 and English Translation, in 13 pages.
Carr, R.J.G., et al. "Submicron optical sources for single macromolecule detection." Proceedings of the SPIE, SPIE, Bellingham, VA, US, vol. 1796, Sep. 8, 1992, pp. 152-156.
Balaur, E., et al. "Continuously tunable, polarization controlled, colour palette produced from nanoscale plasmonic pixels." Scientific reports 6 (2016): 28062.
Office Action dated Aug. 22, 2023 for Chinese Patent Application No. 201980090294.2.
Office Action for Japanese Patent Application No. 2021-530110, 2021.
Office Action dated Sep. 14, 2023 for Canadian Patent Application No. 3,121,434.
Office Action dated Sep. 14, 2023 for Canadian Patent Application No. 3,121,425.
Office Action dated May 3, 2024 for India patent application No. 202127023681.
Office Action and Search Report dated Nov. 20, 2023 for China patent application No. 201980090311.2.
Office Action and Search Report dated Jan. 3, 2024 for China patent application No. 201980090290.4.

\* cited by examiner

FIG. 1b  FIG. 1c

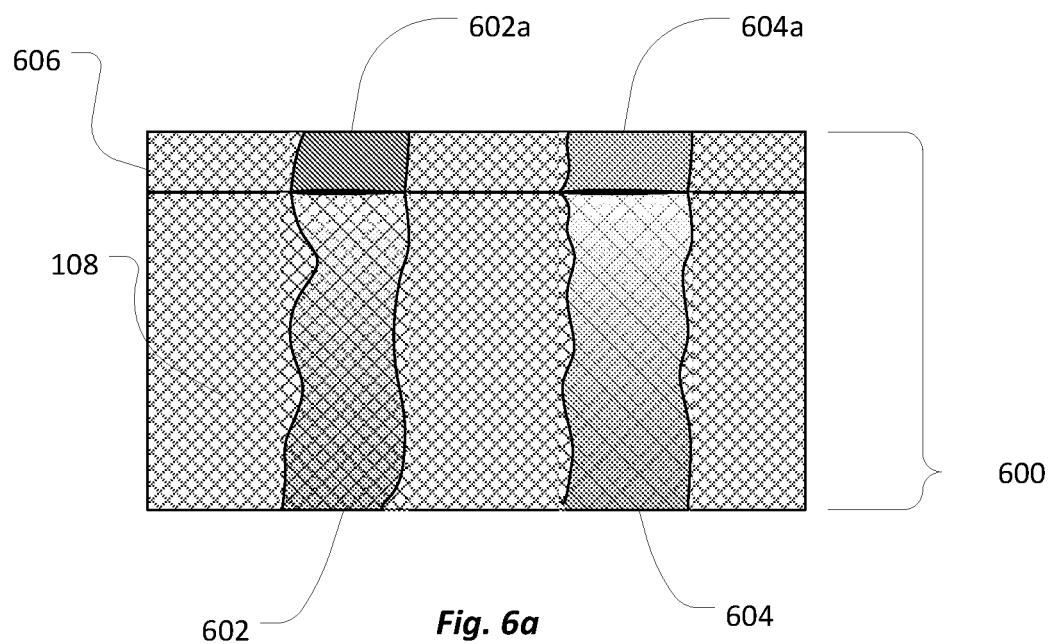
*Fig. 6a*
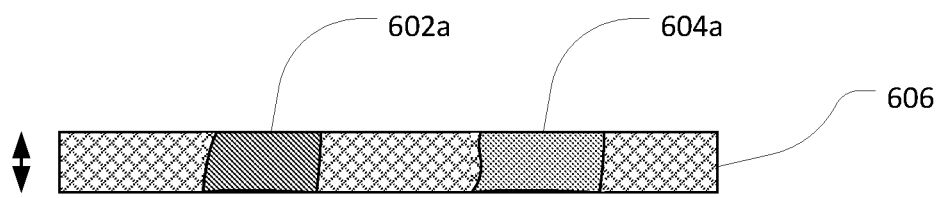
*Fig. 6b*
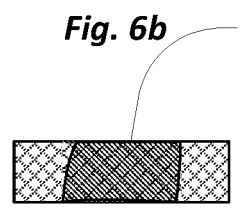
*Fig. 6c*
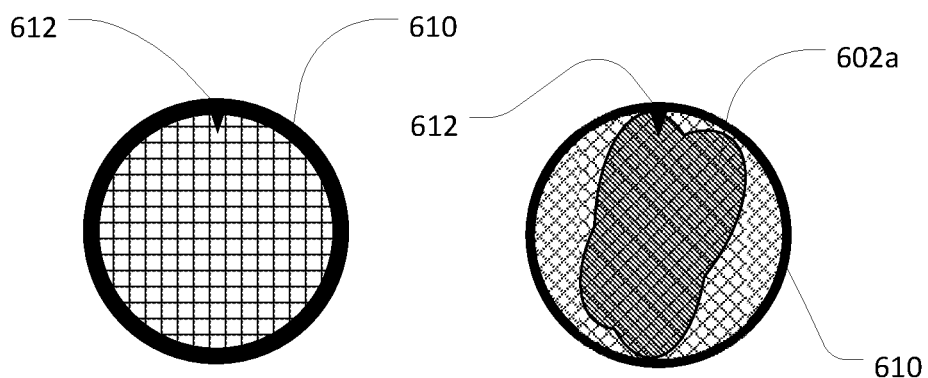
*Fig. 6d*     *Fig. 6e*

METHOD OF ANALYSIS OF A SAMPLE INCLUDING FORMING AN IMAGE AND CONTROLLING A SUBSEQUENT ANALYSIS PROCESS USING THE IMAGE FORMED

FIELD OF THE DISCLOSURE

The present disclosure relates to the field of microscopy, histology and pathology. In one form the disclosure provides systems and methods of performing histology using an optical microscope and an enhanced sample holder.

BACKGROUND OF THE DISCLOSURE

PCT/AU2018/050496 in the name of La Trobe University (the entire contents of which are herein incorporated by reference) discloses systems and methods of optical microscopy which provide enhanced image contrast through use of a sample holder having a plasmonic layer including a periodic array of sub-micron structures. In the present disclosure reference to a nanoslide is reference to a sample holder in accordance with the teaching of PCT/AU2018/050496, or the Applicant's co-pending Australian patent application 2018904553, filed on 29 Nov. 2018, entitled "Microscopy method and system" and the International patent application claiming priority to AU2018904553 which was filed on the same day as the present application, the contents of both being incorporated herein by reference for all purposes. Microscopy methods using such a sample holder are called histoplasmonics or colour contrast microscopy herein, which is abbreviated to CCM. The sample is placed on the sample holder adjacent the plasmonic layer. In use, the sample and sample holder are illuminated with light, usually wideband white light, and an image of the sample is created. The inventors have observed that through interaction of the light with the sample and the plasmonic layer, a colour contrast can be exhibited in the generated image. In particular, areas of the sample having different dielectric constants appear in the image with different colours. Intensity contrast is also achieved. In contrast to this, images obtained from conventional optical microscopy using a stained sample typically only exhibit an intensity contrast in a single colour which corresponds to the stain used.

One benefit of using a nanoslide of this type is that colour contrast may be displayed without staining, and/or by relatively thin samples.

SUMMARY OF THE DISCLOSURE

The present inventors have realised that use of the nanoslide enables useful improvements to microscopy techniques which leverage one or both of these unique advantages.

In a first aspect there is provided a method of selecting a region of interest of a sample for use in a subsequent analysis process. The method may include:
providing a sample holder having an upper surface face and a lower surface, the upper surface having a plasmonic layer associated therewith, the plasmonic layer including a periodic array of sub-micron structures;
applying a sample, in which the region of interest is to be determined, to the upper surface of the sample holder;
illuminating the sample with light so that said light interacts with the sample and sample holder;
forming an image using said light, after interaction with said sample and sample holder, wherein at least one localised structural property of the sample is visible in the image based on the colour of received light; and
selecting a region of interest of said sample applied to the sample holder at least partly on the basis of the colour of at least part of the sample.

The localised structural property is preferably the dielectric constant of the sample at a location.

The method can include performing a subsequent analysis on a subsequent-analysis sample corresponding to the selected region of interest.

Selecting the region of interest can include sectioning a portion of the sample including the region of interest to create the subsequent-analysis sample corresponding to the selected region of interest.

In another aspect the present invention provides a method of analysis of a sample, the method comprising:
providing a sample holder having an upper surface and a lower surface, the upper surface having a plasmonic layer associated therewith, the plasmonic layer including a periodic array of sub-micron structures;
applying the sample to the upper surface of the sample holder;
illuminating the sample with light so that said light interacts with the sample and sample holder;
forming an image using said light, after interaction with said sample and sample holder, wherein at least one localised structural property of the sample is visible in the image based on the colour of the received light; and
using the image formed to control a subsequent analysis process.

Using the image formed to control a subsequent analysis process can include any one or more of the following:
defining one or more datum points and/or a coordinate system used in the subsequent analysis;
selecting a region of a sample for further analysis; and
determining an order or schedule for said subsequent analysis.

In some embodiments of either of the above aspects the method can include selecting a region of interest of said sample applied to the sample holder, and performing a subsequent analysis on a subsequent-analysis sample corresponding to the selected region of interest. Selecting the region of interest of the sample can include sectioning a portion of the sample including selected region of interest to create the subsequent-analysis sample corresponding to the selected region of interest.

In some embodiments of the first or second aspects, the subsequent-analysis sample corresponding to the selected region of interest can be a different sample that is spatially corresponding to the selected region of interest, that is acquired from the same tissue sample. For example, the subsequent-analysis sample may be a sample substantially spatially corresponding in plan view to the selected region of interest which is derived from the same tissue sample in an adjacent or near adjacent section thereof.

The same sample may be used as the subsequent-analysis sample.

In some embodiments of the above aspects the subsequent analysis process is a subsequent imaging process. In preferred embodiments the subsequent analysis process is a subsequent microscopy process.

In some embodiments the subsequent microscopy process is an optical microscopy process.

In some embodiments the subsequent microscopy process is an electron microscopy process.

In some embodiments the subsequent microscopy process is a scanning probe microscopy process.

In some embodiments the subsequent microscopy process is an X-ray microscopy process.

The subsequent analysis process may be a transmission electron microscopy (TEM) process.

In some embodiments of either of the first or second aspects, the method includes determining an order or schedule for said subsequent analysis. The method can include preferentially performing the subsequent analysis on a region of interest. This can include only performing the subsequent analysis on a region of interest. Alternatively the method includes performing the subsequent analysis on a region of interest before other regions not being a region of interest.

In some embodiments of either of the first or second aspects, the method can include transferring one or more datum points and/or a coordinate system from the sample for use in the subsequent analysis. This can include physically marking one or more datum points. Alternatively it can include aligning existing datum points or coordinate systems between a reference frame used when the image was formed using said light, and a reference frame used in performing the subsequent analysis. For example an orientation of the sample can be determined with respect to one or more datum points or coordinate systems related to the sample holder.

In another aspect there is provided a method of analysing a sample, said method including providing a sample comprising a region of interest; wherein the region of interest is selected according to an embodiment of the first aspect of the present disclosure before subsequent analysis based on the region of interest.

The analysis process may be a subsequent imaging process. In the imaging process can be a microscopy process.

In some embodiments the subsequent microscopy process is an optical microscopy process.

In some embodiments the subsequent microscopy process is an electron microscopy process.

In some embodiments the subsequent microscopy process is a scanning probe microscopy process.

In some embodiments the subsequent microscopy process is an X-ray microscopy process.

The subsequent microscopy process may be a TEM process.

In a further aspect there is provided a system for forming an image using an embodiment of any one of the aspects set out above. The system can include a microscope having an image forming system, and an illumination system, and sample holder having an upper surface and a lower surface, the upper surface having a plasmonic layer associated therewith, the plasmonic layer including a periodic array of sub-micron structures. The system can include an image capture system to generate an image of the sample.

The system can include a system for a subsequent analysis.

In the above aspects of the present disclosure the sample may be a biological sample.

Identification of structures or regions of interest in embodiments of the aspects disclosed herein can be performed in accordance with an embodiment of any one of:
- the Applicant's co-pending Australian patent application 2018904550, filed on 29 Nov. 2018, entitled "Method of identifying a structure" and the International patent application claiming priority to AU 2018904550, which was filed on the same day as the present application;
- the Applicant's co-pending Australian patent application 2018904551, filed on 29 Nov. 2018, entitled "Automated method of identifying a structure" and the International patent application claiming priority to AU2018904551 which was filed on the same day as the present application;
- the contents of each application being incorporated herein by reference for all purposes.

In the present specification "forming an image" includes forming a human perceptible image, e.g. by focusing light so that a user can perceive an image of the sample (or part thereof); or generating a digital or photographic image of the sample (or part thereof) for storage, transmission, display or other downstream process.

It should be noted that the term upper surface and lower surface are not intended to reference a specific orientation of the sample holder either during sample preparation or use.

BRIEF DESCRIPTION OF THE DRAWINGS

Illustrative embodiment of the present invention will be described by way of non-limiting example with reference to the accompanying drawings. The drawings filed with the present international application include colour images used in, and arising from use of embodiments of the present invention. The colour information forms part of the disclosure of the embodiments. Should black and white or greyscale reproduction of the images occur, colour disclosure can be obtained from the originally filed documents. In the drawings:

FIGS. 1a to 1c illustrate details of exemplary sample holders used in embodiments of the present disclosure. The present invention should not be considered to be limited to use of sample holders with the particular microstructure array illustrated in these figures.

FIGS. 6a to 6e illustrates steps usable in several embodiments to prepare a subsequent-analysis sample based on an identified ROI.

DETAILED DESCRIPTION OF THE EMBODIMENTS

Figure 1A:
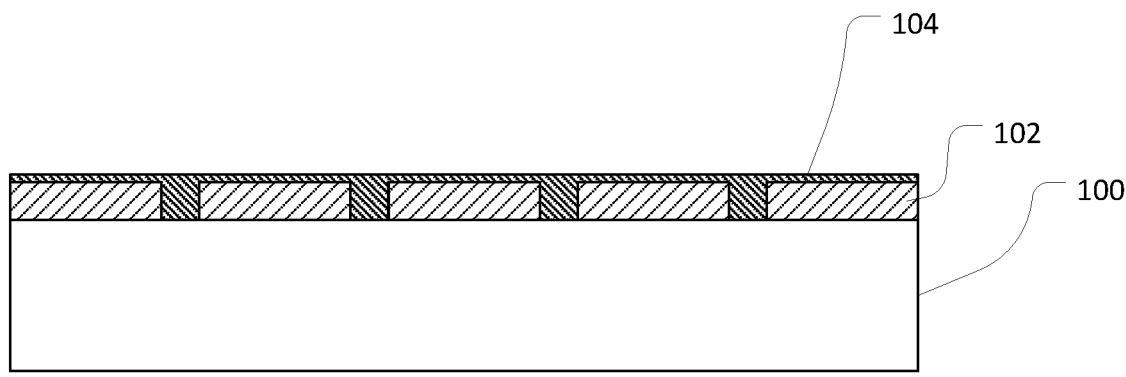

The present inventors have realised that use of a nanoslide enables useful improvements to analysis techniques which leverage on one or more of the unique advantages of the nanoslide.

In particular embodiments, the use of a nanoslide enhances the ability to rapidly identify structures in the sample as structural differences are presented in contrasting colours, typically without needing to stain the sample. In other embodiments, use of a nanoslide may enhance the ability to see structures in a sample by selectively exhibiting colour contrast in a portion of a sample, the portion of the sample that selectively exhibits colour contrast is that portion (e.g. planar region) within a characteristic decay distance from the sample holder. In contrast conventional optical microscopy that uses stains or dyes to enhance or cause intensity contrast in a sample when it is illuminated show such contrast throughout the whole width of the sample. This has the disadvantage that the view of the sample (or image taken thereof) is in effect a two dimensional projection of the total light absorption through the whole thickness of the sample. This can have the effect of obscuring detail in the sample for the viewer. In contrast, histology with a nanoslide only induces colour contrast in a portion of the sample nearest the sample holder and thus may usefully show smaller structures than conventional microscopy relying on staining alone to generate an intensity contrast in the received light. Moreover staining can take many minutes or longer to generate a usable sample.

In preferred forms the nanoslide can be used as an initial stage in an analysis process. The imaging phase using the nanoslide can provide a useful triage process prior to subsequent analysis of a sample. The triage process can be used to identify a region of interest in a sample for subsequent analysis. For example the presence or absence of a given structure or characteristic of a structure (e.g. a cell, part of a cell, tissue etc.) can be used to define a region of interest for the subsequent analysis process.

For example the ability of the nanoslide to provide useful appearance of contrast in a sample using a conventional optical microscope, without staining and often without specialised sample preparation, can enable rapid identification of samples or parts of samples that require subsequent analysis. Moreover the nanoslide enables visual imaging in samples that may not otherwise provide significant visual contrast.

Due to the sample preparation requirements of some analysis techniques, it may be impractical for the sample which undergoes imaging using the nanoslide to be used in the subsequent analysis process. In such a case, or if additional samples are needed for analysis, a corresponding sample can be used for the subsequent analysis, for example an adjacent or nearby section of the same tissue can be used in the subsequent analysis. The sample imaged on the nanoslide and the corresponding subsequent-analysis sample can be overlying slices (preferably, but not necessarily adjacent) of the same tissue sample, such that they have the same or similar structural make up when viewed in plan view (i.e. in a direction normal to the slice face).

FIG. 1a shows an embodiment of a sample holder used in an example of the present disclosure. FIG. 1a shows a cross section through a sample holder suitable for use in the present invention. The sample holder 100 includes a substrate, on which is deposited a plasmonic layer 102. FIGS. 1b and 1c show the two types of plasmonic layer 102 with sub-micron arrays of that have been fabricated and which may be used in an embodiment. Other arrays, including 1-dimensional arrays of lines may be used in other embodiments. The plasmonic layers are each 150 nm thick silver films, although other suitable materials can be used. FIG. 1a has sub-micron arrays in the form of circular shaped nanoapertures with a 450 nm period arranged in a hexagonal pattern. FIG. 1c has cross-shaped nanoapertures on a rectangular pattern. The cross-shaped nanoapertures have a 450 nm period in one direction (defined here as the 0° direction) and a 400 nm period in the orthogonal direction (defined as the 90° direction). These arrays have an SPP resonance mode in the 470-550 nm range, (which is within the visible region of the electromagnetic spectrum). To protect the surface of the plasmonic layer 102, a layer 104 (10 nm±1 nm) of hydrogen silsesquioxane (HSQ), a glass-like material, is deposited after fabrication of the plasmonic layer 102. After capping with HSQ, the sample holder 100 has an upper surface similar to that of a conventional microscope slide on which a sample may be supported. In other embodiments a metal oxide capping layer e.g. $SiO_2$ can be used in place of HSQ.

Figure 2A:
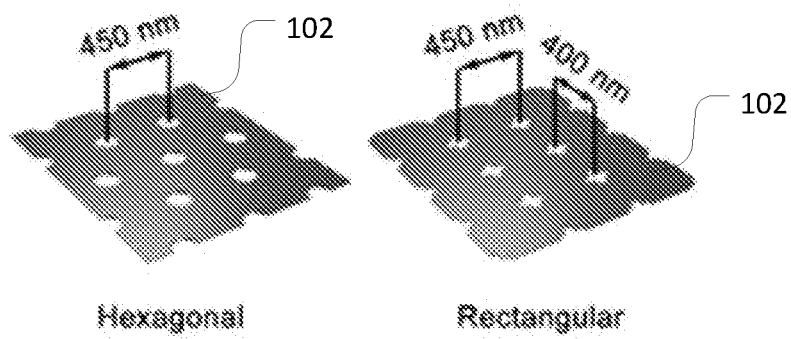
FIGS. 2a and 2b illustrates an example sample holder from FIG. 1a on which are positioned samples for use in embodiments of the present invention.
Figure 2A:
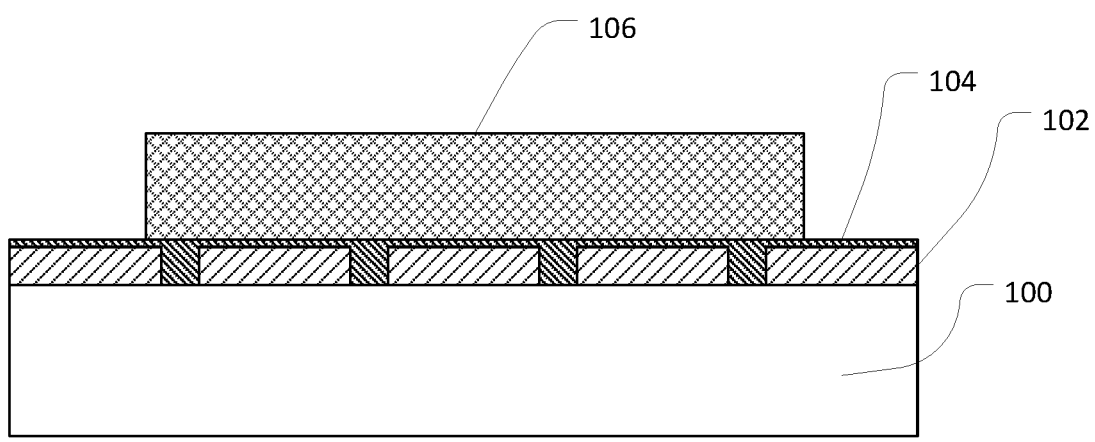

Samples to be imaged are prepared and placed on a sample holder in accordance with an embodiment of PCT/AU2018/050496 in the name of La Trobe University or the Applicant's co-pending Australian patent application 2018904553, filed on 29 Nov. 2018, entitled "Microscopy method and system" and the International patent application claiming priority to AU2018904553 which was filed on the same day as the present application. A sample 106, typically a slice of a biological tissue, which need not be stained in the preferred embodiment of the present invention, is placed on the sample holder adjacent the plasmonic layer, as shown in FIG. 2a.

Figure 3:
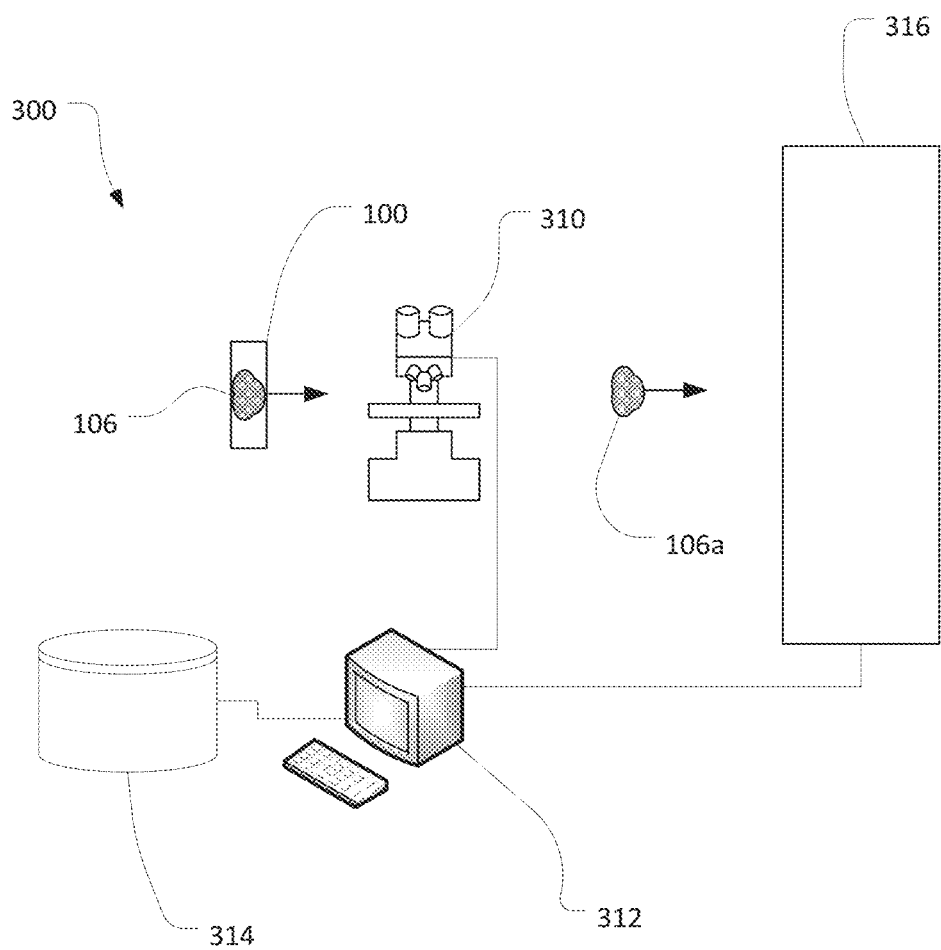
FIG. 3 is a schematic diagram of a system usable to perform an embodiment of the present invention.

FIG. 3 is a schematic representation of a system 300 configured to perform methods according to the present disclosure. In overview the system 300 includes a microscope 310 adapted to receive a sample holder 100. The sample holder 100 is a nanoslide (a sample holder made in accordance with an aspect of PCT/AU2018/050496) having a plasmonic layer. The sample 106 that is to be imaged is positioned on the sample holder. In some embodiments the microscope is a conventional optical microscope with eyepieces for viewing by a user, however it can alternatively or additionally include an image capture system to generate a digital image for display, storage or other later use. In some forms the microscope 310 can form part of an automated slide scanner. The exemplary system 300 illustrated includes a user terminal 312 for display of captured digital images of the sample and a data storage system 314 for storing captured images. The system 300 further includes a subsequent analysis system 316. In use, if a region of interest in the sample 106 is selected using the nanoslide imaging process, further analysis can be performed using the subsequent analysis system 316. Depending on the requirements of the system 316 the subsequent-analysis sample 106a can be the same as sample 106. Alternatively sample 106 may be processed and or sectioned to create sample 106a. In a further example a different, but corresponding sample 106s (not shown) may be used in the subsequent analysis process using system 316.

Figure 4:
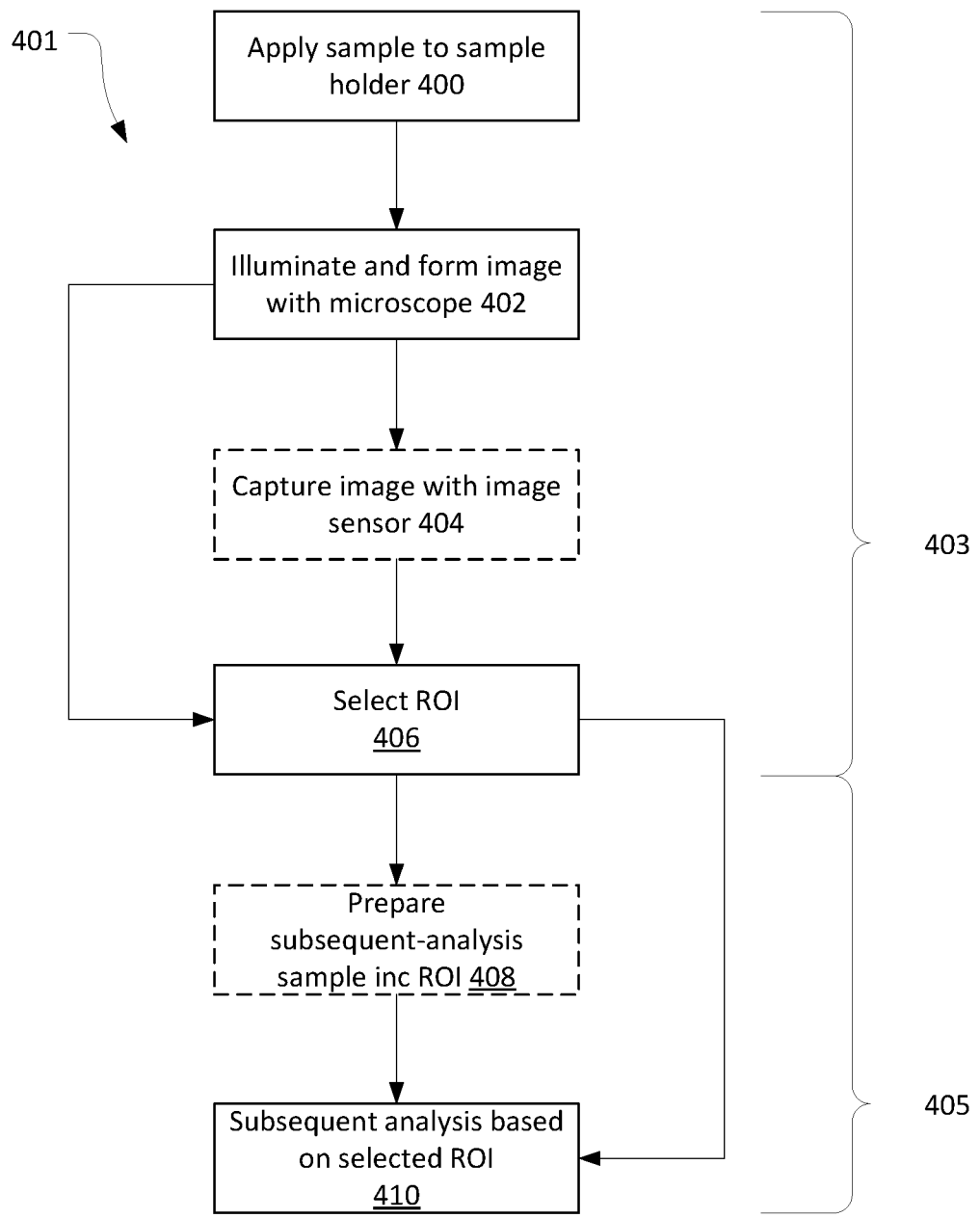
FIG. 4 is a flowchart illustrating steps in one method performed in an embodiment of the present invention.

The subsequent analysis process can be a subsequent imaging process. For example it may be a subsequent microscopy process, such as optical, electron, scanning probe or X-ray microscopy. In the exemplary embodiment the analysis system 316 is a transmission electron microscope. FIG. 4 is a flowchart illustrating steps of aspects of the present disclosure that can be used to select a region of interest for subsequent analysis. In an initial phase the method 401 includes a process for selecting 403 a region of interest of a sample for use in a subsequent analysis process 405. In this case the sample, can be a sample 106 of FIG. 2a, 2b or the like. The method 401 begins at step 400 by applying the sample 106 to a sample holder 100, in this case a nanoslide. The slide and sample holder 100 are illuminated as set out herein at 402 and an image is formed. Optionally the image is captured in digital form in step 404. Following this, the image as perceived directly by a user or as captured in step 404, are analysed and one or more structural features in the sample may be identified at 408 as a region of interest (ROI) on which a subsequent analysis is to be performed. The selection of the ROI in step 406 and can be performed either by a person or in an automated fashion as set out in the Applicant's co-pending Australian patent application 2018904551, filed on 29 Nov. 2018, entitled "Automated method of identifying a structure" and the International patent application claiming priority to AU2018904551 which was filed on the same day as the present application, the contents of both being incorporated herein by reference for all purposes.

The identification of the ROI step 406 is performed using at least the colour exhibited in the image of the sample. The colour at a particular location in the image is representative of a local physical property of the sample. In particular, by using a sample holder having a plasmonic layer including a periodic array of sub-micron structures (a nanoslide) a colour contrast is exhibited which encodes the localised dielectric constant in the sample. The selection of the ROI from the image seeks to identify and select one or more structures of interest in the sample on which further analysis is desirable. A structure of interest can, for example include, a cell, group of cells, part of a cell, interstitial space between cells, a void in a cell, or a morphology of any of the above. Most preferably the features of interest and/or structures are indicative of the health of the sample or part thereof.

Figure 2B:
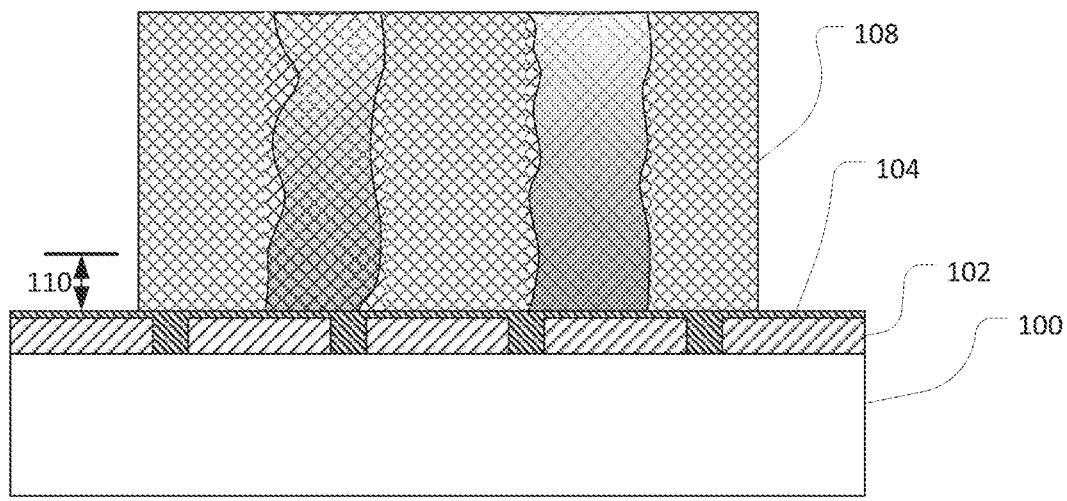

The underlying mechanism for the extraordinary optical contrast in the images is the resonant interaction of light with the collective oscillations of free electrons at a metal surface in the plasmonic layer of the sample holder, known as Surface Plasmon Polaritons (SPPs). The spectral change in transmitted light through an array of sub-wavelength apertures in contact with a dielectric specimen is a function of the wavelength shift, $\Delta\lambda$ of the SPP resonant modes $\lambda^\theta_{SPP,d}$, where superscript $\theta$ denotes the incident polarisation angle (the symbol is removed for unpolarised light) and the subscript indicates whether the dielectric constant is for the sample (d=s) or for air (d=a). The SPP modes are characterised by peaks in the transmission spectra, the corresponding wavelength shift relative to air when a sample of thickness t is placed on top of the nanoapertures is given by:

$$\Delta\lambda \approx (\lambda^\theta_{SPP,s} - \lambda^\theta_{SPP,a})(1-\exp(-2t/l_d)), \quad (1)$$

where $l_d \sim \lambda/2\sqrt{\varepsilon_d}$ is the characteristic decay length of the SPP electromagnetic field, which is itself a function of $\varepsilon_d$, the dielectric constant of the sample. FIG. 2b illustrates a sample that is thicker than the characteristic decay length. In this example the characteristic decay length $l_d$ is indicated by reference number 110. As can be seen the sample 108 on the sample holder 100 is thicker than the decay length 110. As the film thickness increases, the transmission SPP resonance peak is increasingly red-shifted until it equals $\lambda^\theta_{SPP}$, after which no more colour change occurs. It follows that, when using a standard transmission bright-field microscope, a spatially resolved distribution of colours will result that relates directly to changes in the local dielectric constant in the sample. With the local dielectric constant encoded in the optical spectrum, a remarkable chromatic contrast effect is produced. This means that any structure within optically transparent samples, which was previously difficult to detect due to a lack of contrast, is detectable in the visible-light transmission image, by virtue of the colour contrast captured in the images. Moreover, and in contrast to conventional optical microscopy which use stains or dyes to induce or enhance intensity contrast in a sample when it is illuminated, preferred embodiments generate discernible colour contrast representing a narrow layer within the sample—less than approximately 200 nm. Conventional microscopy shows intensity contrast throughout the whole thickness of the sample. This has the disadvantage (in conventional microscopy) that the image of the sample is in effect a two dimensional projection of the total light absorption through the whole thickness of the sample (which may be significantly thicker than 200 nm). This can have the effect of obscuring detail in the sample for the viewer. Visually this can smear or blur the structure visible in the image. In contrast, histology with a nanoslide only induces colour contrast in a portion of the sample nearest the sample holder and thus may usefully show structures with a size smaller than conventional microscopy relying on staining alone. As will be appreciated by those skilled in the art of conventional optical microscopy, thinner slices can ameliorate the smearing or blurring problem somewhat, but cause a concomitant disadvantage that thin slices may not show appreciable intensity contrast with a thin slice.

The ability of optical microscopy using a nanoslide sample holder having an upper surface face and a lower surface, the upper surface having a plasmonic layer associated therewith, the plasmonic layer including a periodic array of sub-micron structures, to render structures visible in colour without the need for protracted sample preparation (compared to most microscopy techniques) means that it is ideally suited to the rapid and potentially non-destructive process for identifying a region of interest of a sample for subsequent analysis. The subsequent analysis in step 410 can take place using a different analysis modality in such a way that takes advantage of the prior selection of the region of interest, for example:

- the sample on which subsequent analysis is performed may be orientated or mapped based on one or more datum points and/or a coordinate system determined from the process 403;
- a physical selection of a portion of the sample can be made, e.g. by sectioning a portion of the sample that includes the region of interest to create the subsequent-analysis sample so that the ROI can be analysed more effectively or efficiently, e.g.
- without analysing the remainder of the original sample; or the order or schedule for the said subsequent analysis can be performed to preferentially treat the ROI, e.g. to analyse it first, or in greater detail, etc.

Figure 5:
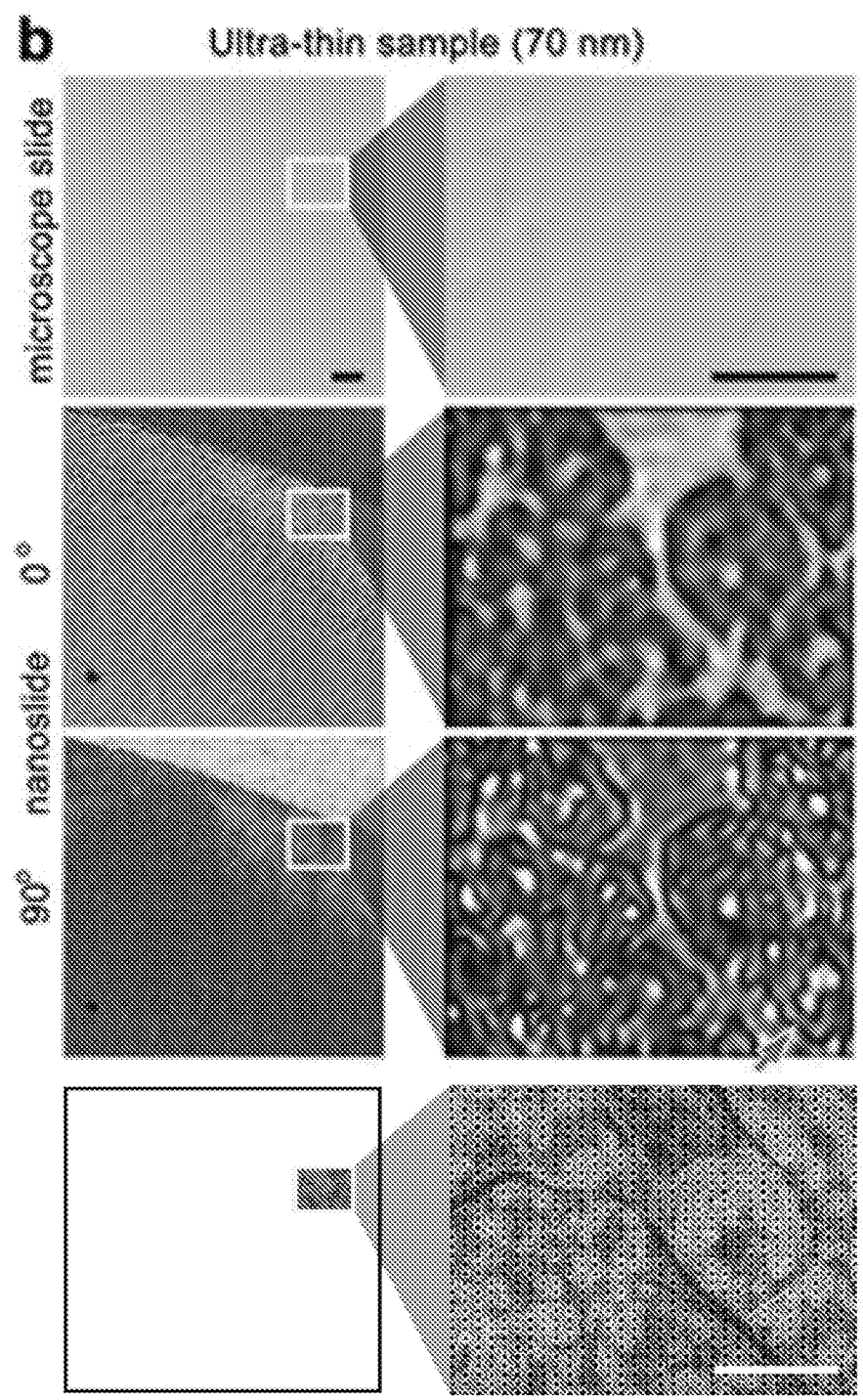
FIG. 5 illustrates images formed using an unstained sample on a conventional microscope slide (top); an unstained sample on a nanoslide using light of a first polarisation showing a first colour contrast image that can be used to identify structures of the sample (middle); an unstained sample on a nanoslide using light of a second polarisation 90° to the first polarisation, showing a second colour contrast image that can be used to identify structures of the sample (third); an SEM image (bottom) of a corresponding sample captured in a subsequent analysis process.

FIG. 5 illustrates several examples of images captured using process 403 and which illustrate the ability to identify structures in the exemplary samples. The images are presented as they appear under the microscope with no staining or labelling.

For these histological samples, transgenic mice were produced by microinjection of a 4.7 Kb DNA fragment consisting of 1.3 Kb of MBP 58 sequences and 3.4 Kb of c-myc genomic DNA including part of intron 1, exons 2 to 3, and 316 bp of 38 untranslated sequences 19. The 2-50 pedigree carries approximately 10 copies of the construct on chromosome 9 and was isolated on the basis of a shivering phenotype evident in that pedigree alone, out of seven originally generated. The transgenic mice and nontransgenic littermates were perfused through the left ventricle with phosphate-buffered saline at 37° C. for 2 min, followed by 4% paraformaldehyde/2.5% glutaraldehyde in phosphate buffer, pH 7.4 containing 200 IU heparin/100 ml. For FIG. 5, tissue was left in situ at 4° C. for 1 hr before sections were cut from the optic nerve via microtomy. Tissues were fixed in 10% buffered formalin, paraffin embedded and sectioned onto glass slides or nanoslides.

FIG. 5 shows images collected from optic nerve slices that are 70 nm thick. Such sections can typically only be viewed using TEM and are essentially invisible using conventional optical microscopy, as can be seen in the top panel, which shows unstained samples. The middle and lower panels show an image (left) and close-up detail thereof (right). The middle panels show the image captured with the sample being illuminated with 0° incident polarisation. The lower panels show the same sample but illuminated with light having a 90° incident polarisation.

The nanoslides used include periodic arrays of nanoapertures, which were fabricated using either focused ion beam (FIB) lithography technique (Helios NanoLab 600 Dual Beam FIB-SEM, FEI) or photolithography (for large areas). A hydrogen silsesquioxane (HSQ) protective layer was spun after the array fabrication. HSQ was converted into amorphous silicon oxide via exposure to electrons. In the example of FIG. 5 the periodic array has the structure set out in connection with FIG. 1c, which has cross-shaped nanoapertures on a rectangular pattern. The cross-shaped nanoapertures have a 450 nm period in one direction (defined here as the 0° direction) and a 400 nm period in the orthogonal direction (defined as the 90° direction).

Bright-field and DIC data were collected using a Nikon Ti-U microscope system with a 60× (NA=0.7) objective; spectral data were collected using an IsoPlane SCT 320 (Princeton Instruments) at 1200 gratings/mm. The spectral data were normalized with respect to the bare substrate. All images presented here are 'as viewed' through the microscope without any image manipulation applied whatsoever. A Bruker Dimension Icon AFM was used to collect the topographical data and line scans.

As can be readily seen in the second and third images, using the nanoslide, structures in the sample can be readily visualised due to the colour contrast exhibited in the image. The colours of different structures within the sample reflect areas of different dielectric constant. Moreover structures of the same type also tend to appear in the same colour throughout the sample enabling reliable identification of such structures.

It has been observed by the inventors that changing the incident polarisation direction (which had no effect on the conventional bright-field images) enabled subcellular structure of the tissue, such as the myelin sheath which is critical for a wide spectrum of pathologies, to be selectively enhanced. This is believed to be due to the different periodicity of the sub-micron arrays in a direction parallel to each of the polarisation angles. The different periodicity is believed to tune the transmission spectra so that the colour at which a structure of a given dielectric constant appears changes. This enables selective enhancement or colouring of structures with certain properties. It follows that that colour tuning of a typical target structure (e.g. cell type) can be performed by selecting the parameters of the sub-micron periodic structure, e.g. one or more of period, size, shape, array geometry, so that the target structure appears in a characteristic colour or colour band. As will be appreciated this greatly enhances rapid detection of a target structure or determination of its characteristics.

By using the nanoslide for visualisation in selection process 403, a region of interest can be determined and used for subsequent imaging. For example it may be determined that the region magnified in the right hand images and indicated by a square in the left hand images is a region of interest to be analysed in the subsequent analysis process 405.

As will be appreciated the identification of cancer and other disease may be based on subtle changes in cellular morphology such as alteration to the cell cytoskeleton and nucleus. This includes cell symmetry, shape, nuclear pleomorphism/organisation. Distinguishing cell types may be based on cell size, shape and tissue organisation. Use of embodiments of the present invention allow enhanced visibility of such characteristics and structures provided by the use of the nanoslide to define a region of interest for a subsequent analysis process. Moreover, when morphology is decreased/compromised (due to tissue preservation/preparation techniques or when there are only very few cancer slides present that become difficult to find) it is very difficult to make accurate diagnoses of cancer based in morphology alone. In such situations embodiments of the present invention offer colour as a distinguishing feature. That is colour contrast can still be visible when larger scale morphology is compromised enabling a ROI to be defined. Depending on the nature of the subsequent analysis process in step 410 it may be necessary to perform suitable sample preparation steps 408 to create a suitable subsequent-analysis sample. In some embodiments this can include sectioning a portion of the sample used in process 404 including the selected region of interest to create the subsequent-analysis sample corresponding to the selected region of interest.

However, in other embodiments the subsequent-analysis sample corresponding to the selected region of interest can be a different sample that spatially corresponds to the selected region of interest that is acquired from the same tissue sample. For example, the subsequent-analysis sample may be a sample substantially spatially corresponding in plan view to the selected region of interest which is derived from the same tissue sample in an adjacent or near adjacent section thereof.

The bottom panel of FIG. 5 illustrates an image captured by a scanning electron microscope of the selected region of interest (i.e. the magnified portion illustrated on the right and indicated by the box on the whole sample image). The SEM imaging in this case is performed on the same sample as used or nanoslide optical microscopy, but may be performed is performed on a subsequent analysis sample spatially corresponding to that imaged in the top three panels of FIG. 5.

In step 410 since the ROI is of primary importance the SEM process can be limited to either the ROI. Alternatively the ROI may be imaged before other portions of the sample. In some embodiments the subsequent analysis process can be guided by the ROI, for example the analysis parameters used for the subsequent analysis can be chosen to optimise the analysis of the region of interest.

As will be observed in the SEM image of FIG. 5, the sub-micron structures in the plasmonic layer of the sample holder appear as a series of black dots in the SEM image.

An example of each of these situations is shown in FIG. 6. In this example a first sample 108 is sectioned from tissue sample 600. The sample 108 is applied to the nanoslide as illustrated in FIG. 2b and imaged as described above. In this case two structures 602 and 604 are visible in the sample on the nanoslide. However due to the relative colour of the structures compared to each other and/or the surrounding tissue the portion 602 is determined to need further analysis and is selected to be a region of interest. Due to the thickness of the sample 108 it will need to be sectioned into a thinner slice and smaller portion to be used for TEM analysis, e.g. it would need to be cut down to a disc of around 3 mm diameter with a thickness of 70 nm. Appropriate fixing, resin infiltration and setting and other process known to those skilled in the art of TEM microscopy will also be needed. Whilst this is possible, it may not be practical, e.g. if incompatible handling has been needed for preparation of sample 108. Therefore in some embodiments a different subsequent-analysis sample can be created which corresponds to the region of interest. For example it may be possible to use a tissue section that has been sliced from the same tissue sample as the sample 108. This is shown in FIG. 6a. The section 606 is a slice overlying sample 108 in tissue sample 600. As can be seen, in plan view the section 606 will have similar features (602a and 604a) to the sample 108, in particular in plan view (i.e. when viewed in a direction perpendicular to the direction of the slice) they may closely correspond. It will be appreciated that, whilst the slice 606 is directly adjacent the sample 108, in practice the subsequent-analysis sample 606 may be derived from a location separated from the sample 108, so long as it is expected to share structural features with the ROI in the sample 108 to a significant extent for the subsequent analysis to have value.

Further sectioning of the sample 606 can take place so that the portion of the sample corresponding to the region of interest 602 is prepared for subsequent analysis.

As will be understood for a TEM example this typically means placing a prepared sample on a TEM grid 610 such as that shown in FIG. 6d. It is possible that the TEM grid may have an identifiable datum 612 or axis defined thereon. This can be aligned with the subsequent analysis sample such that any datum or coordinate axis defined in the nanoslide imaging process is positioned in a known relationship with the datum 612 or coordinate axis of the TEM grid. FIG. 6e illustrates the sample of FIG. 6c applied to the grid 610 so that the region of interest 602a can be imaged in a TEM process.

Figure 7:
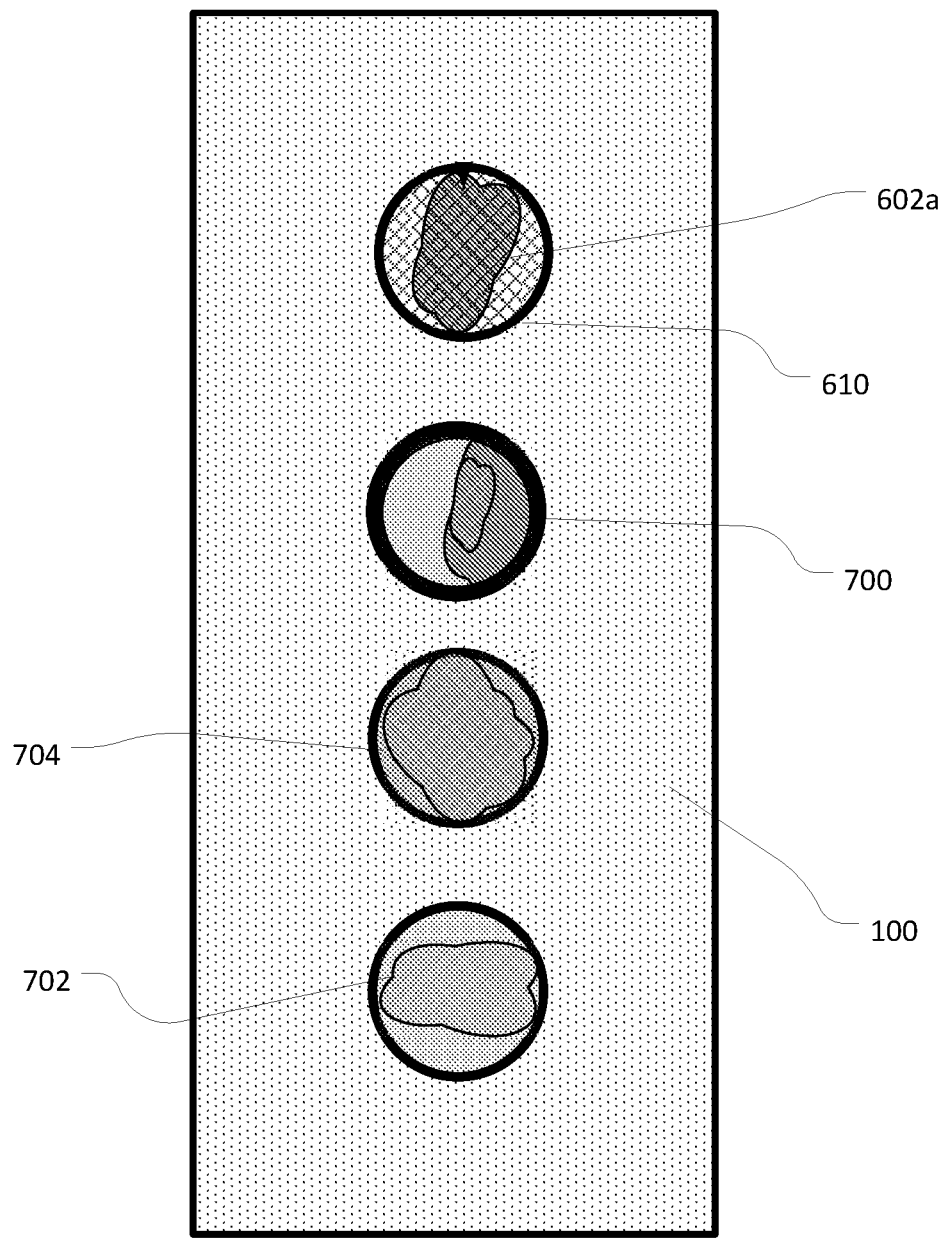
FIG. 7 illustrates an example of a nanoslide sample holder on which several samples are positioned to enable identification of one or more ROIs for subsequent analysis.

FIG. 7 illustrates an alternative embodiment of the present method. In this embodiment a nanoslide 100 is provided. A series of TEM grids and associated samples e.g. grid 610 and sample 602a are placed thereon. The series of samples can then be imaged together using the nanoslide as described in relation to selection process 403, and one or more of the TEM grids and associated samples can be selected as regions of interest for subsequent analysis. In this example this may simply require loading the selected samples on their TEM grids into the TEM for imaging. In this case unnecessary TEM imaging need not be performed on samples that do not present any interest in the initial imaging process. In this embodiment the upper surface of the nanoslide 100 can be provided with a release layer, or other technique used to facilitate removal of the TEM grid from the nanoslide to enable TEM analysis to be performed. For example the TEM grid may be floated off the nanoslide, or released by application of electrostatic or sonic energy.

For example in this case the blue colouring of the samples 602a and 700 may indicate that they are regions of interest, whereas the green samples 702 and 704 may indicate healthy tissue requiring no further analysis.

Whist TEM has been described in this embodiment the disclosure should not be considered as being so limited. Embodiments may use other subsequent analysis techniques. It will be appreciated that the practical efficiency and useful throughput of the subsequent analysis systems can be improved by selecting only suitable ROIs for analysis instead of painstakingly analysing the whole initial sample.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of analysis of a sample, the method comprising:
   providing a sample holder having an upper surface and a lower surface, the upper surface having a plasmonic layer associated therewith, the plasmonic layer including a periodic array of sub-micron structures;
   applying the sample to the upper surface of the sample holder;
   illuminating the sample with light so that said light interacts with the sample and sample holder;
   forming an image using said light, after interaction with said sample and sample holder, wherein at least one localised structural property of the sample is visible in the image based on a colour of the received light; and
   using the image formed to control a subsequent analysis process.

2. The method of claim 1, wherein using the image formed to control a subsequent analysis process includes any one or more of the following:
   defining one or more datum points or a coordinate system used in the subsequent analysis,
   selecting a region of a sample for further analysis; and
   determining an order or schedule for said subsequent analysis.

3. The method as claimed in claim 1, wherein the sample is used as the subsequent-analysis sample.

4. The method as claimed in claim 1, wherein the subsequent analysis process is a subsequent imaging process or a subsequent microscopy process.

5. The method as claimed in claim 1, including one or more of:
   determining an order or schedule for said subsequent analysis;
   performing the subsequent analysis on a region of interest;
   only performing the subsequent analysis on a region of interest;
   performing the subsequent analysis on a region of interest before other regions not being a region of interest; and
   transferring one or more datum points or a coordinate system from the sample for use in the subsequent analysis.

6. The method as claimed in claim 1, wherein the localised structural property is a dielectric constant of the sample at a location.

7. A system for forming an image using a method as claimed in claim 1.

8. A system as claimed in claim 7, including a microscope having an image forming system, an illumination system and a sample holder having an upper surface and a lower surface, the upper surface having a plasmonic layer associated therewith, the plasmonic layer including a periodic array of sub-micron structures.

9. A system as claimed in claim 8, including an image capture system to generate a digital image of the sample.

10. A system as claimed in claim 7, including a system for a subsequent analysis.

11. The system as claimed in claim 10, wherein the system for subsequent analysis includes any one or more of the following:
    an optical microscope;
    an electron microscope;

a scanning probe microscope;
an X-ray microscope;
a transmission electron microscope (TEM).

12. A method of selecting a region of interest of a sample, for use in a subsequent analysis process, the method including:
   providing a sample holder having an upper surface face and a lower surface, the upper surface having a plasmonic layer associated therewith, the plasmonic layer including a periodic array of sub-micron structures;
   applying a sample, in which the region of interest is to be determined, to the upper surface of the sample holder;
   illuminating the sample with light so that said light interacts with the sample and sample holder;
   forming an image using said light, after interaction with said sample and sample holder, wherein at least one localised structural property of the sample is visible in the image based on a colour of received light; and
   selecting a region of interest of said sample applied to the sample holder at least partly on the basis of the colour of at least part of the sample.

13. The method of claim 12, wherein the method further includes, performing a subsequent analysis on a subsequent-analysis sample corresponding to the selected region of interest.

14. The method of claim 12, wherein selecting the region of interest of the sample includes sectioning a portion of the sample including selected region of interest to create the subsequent-analysis sample corresponding to the selected region of interest.

15. The method as claimed in claim 12, wherein the sample is used as the subsequent-analysis sample.

16. The method as claimed in claim 12, wherein the subsequent analysis process is a subsequent imaging process or a subsequent microscopy process.

17. The method as claimed in claim 12, including one or more of:
   determining an order or schedule for said subsequent analysis;
   performing the subsequent analysis on a region of interest;
   only performing the subsequent analysis on a region of interest;
   performing the subsequent analysis on a region of interest before other regions not being a region of interest; and
   transferring one or more datum points or a coordinate system from the sample for use in the subsequent analysis.

18. The method as claimed in claim 12, wherein the localised structural property is a dielectric constant of the sample at a location.

19. A system for forming an image using a method as claimed in claim 12.

20. A system as claimed in claim 19, including a microscope having an image forming system, an illumination system and a system configured to control the subsequent analysis process on the basis of the image formed, for use with a sample holder having an upper surface and a lower surface, the upper surface having a plasmonic layer associated therewith, the plasmonic layer including a periodic array of sub-micron structures.

21. A system as claimed in claim 20, including an image capture system to generate a digital image of the sample.

22. A system as claimed in claim 19, including a system for a subsequent analysis.

23. The system as claimed in claim 22 wherein the system for subsequent analysis includes any one or more of the following:
   an optical microscope;
   an electron microscope;
   a scanning probe microscope;
   an X-ray microscope;
   a transmission electron microscope (TEM).

* * * * *